(12) United States Patent
Riechert et al.

(10) Patent No.: US 11,236,659 B2
(45) Date of Patent: Feb. 1, 2022

(54) DIAGNOSTIC METHOD AND DEVICE FOR CHECKING THE FUNCTIONALITY OF A COMPONENT FOR EXHAUST-GAS AFTERTREATMENT

(71) Applicant: Volkswagen Aktiengesellschaft, Wolfsburg (DE)

(72) Inventors: Christian Riechert, Barleben (DE); Frank-michael Wittig, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 395 days.

(21) Appl. No.: 16/324,035

(22) PCT Filed: Aug. 9, 2017

(86) PCT No.: PCT/EP2017/070138
§ 371 (c)(1),
(2) Date: Mar. 20, 2019

(87) PCT Pub. No.: WO2018/029230
PCT Pub. Date: Feb. 15, 2018

(65) Prior Publication Data
US 2021/0189941 A1     Jun. 24, 2021

(30) Foreign Application Priority Data

Aug. 11, 2016 (DE) ..................... 10 2016 114 901.2

(51) Int. Cl.
*F01N 3/00* (2006.01)
*F01N 11/00* (2006.01)
(Continued)

(52) U.S. Cl.
CPC ............ *F01N 11/007* (2013.01); *F01N 3/035* (2013.01); *F01N 3/101* (2013.01); *F01N 3/323* (2013.01);
(Continued)

(58) Field of Classification Search
CPC ........ F01N 11/007; F01N 3/101; F01N 3/035; F01N 2900/1624; F01N 2430/06
(Continued)

(56) References Cited

U.S. PATENT DOCUMENTS 5,212,947 A * 5/1993 Fujimoto ............ F02D 41/1495
60/276
5,406,789 A    4/1995 Takizawa et al.
(Continued)

FOREIGN PATENT DOCUMENTS

CN      1902386 A    1/2007
CN    101230795      7/2008
(Continued)

OTHER PUBLICATIONS

International Search Report of PCT Application No. PCT/EP2017/070138, dated Oct. 11, 2017.
(Continued)

*Primary Examiner* — Jason D Shanske
(74) *Attorney, Agent, or Firm* — Pearl Cohen Zedek Latzer Baratz LLP

(57) ABSTRACT

The invention relates to a diagnostic method for checking the functionality of a component for the exhaust-gas aftertreatment of an internal combustion engine. For this purpose, in an internal combustion engine, a secondary air supply is provided by means of which an excess of oxygen can be generated in the exhaust gas channel essentially independently of the operating conditions of the internal combustion engine, and wherein said excess of oxygen is
(Continued)

utilized for the measurement of an oxygen storage capacity of the component or of a signal change at the component. It is provided that the component is subsequently subjected to a substoichiometric exhaust gas in order that the oxygen release capacity or the signal change upon a change from superstoichiometric exhaust gas to a substoichiometric exhaust gas is also taken into consideration in the diagnosis. The invention also relates to a device for exhaust-gas aftertreatment, which is designed to be able to carry out a method of said type.

9 Claims, 3 Drawing Sheets

(51) Int. Cl.
  *F01N 3/035* (2006.01)
  *F01N 3/10* (2006.01)
  *F01N 3/32* (2006.01)
(52) U.S. Cl.
  CPC .. *F01N 2430/06* (2013.01); *F01N 2900/1624* (2013.01)
(58) Field of Classification Search
  USPC ............................................................ 60/277
  See application file for complete search history.

(56) References Cited

U.S. PATENT DOCUMENTS

| | | | |
|---|---|---|---|
| 2002/0175086 A1* | 11/2002 | Nakamichi | G01N 27/4175 205/775 |
| 2002/0194836 A1* | 12/2002 | Asik | F02D 41/0275 60/277 |
| 2004/0134186 A1 | 7/2004 | Wang et al. | |
| 2006/0272315 A1* | 12/2006 | Wang | F01N 11/007 60/276 |
| 2007/0062177 A1 | 3/2007 | Kohara et al. | |
| 2007/0137178 A1* | 6/2007 | Schnaibel | F02D 41/0295 60/277 |
| 2008/0184695 A1* | 8/2008 | Anilovich | F02D 41/1495 60/274 |
| 2008/0302087 A1* | 12/2008 | Genslak | F01N 9/00 60/277 |
| 2009/0199543 A1* | 8/2009 | Sawada | F01N 11/007 60/276 |
| 2010/0011749 A1* | 1/2010 | Fujiwara | F01N 3/106 60/286 |
| 2010/0050602 A1* | 3/2010 | Fujimoto | F01N 11/007 60/277 |
| 2010/0192543 A1 | 8/2010 | Fujiwara et al. | |
| 2011/0072800 A1 | 3/2011 | Bidner et al. | |
| 2011/0165040 A1 | 7/2011 | Huang et al. | |
| 2012/0124995 A1 | 5/2012 | Springer et al. | |
| 2014/0044626 A1* | 2/2014 | Greenwell | B01D 53/9454 423/212 |
| 2014/0208718 A1 | 7/2014 | Chu et al. | |
| 2015/0107228 A1* | 4/2015 | Klingmann | F01N 3/035 60/274 |
| 2015/0128905 A1* | 5/2015 | Levijoki | F02D 41/1454 123/435 |
| 2015/0314774 A1* | 11/2015 | Severin | B60K 6/24 701/22 |
| 2016/0032812 A1* | 2/2016 | Lee | F02D 41/1494 73/114.73 |

FOREIGN PATENT DOCUMENTS

| | | |
|---|---|---|
| CN | 102527231 A | 7/2012 |
| DE | 10 2004 001 831 A1 | 7/2004 |
| DE | 10 2006 053 125 A1 | 5/2008 |
| DE | 10 2008 006 631 A1 | 7/2009 |
| DE | 10 2011 002 438 A1 | 7/2012 |
| DE | 10 2013 200 623 A1 | 7/2014 |
| DE | 10 2013 201 228 A1 | 7/2014 |
| EP | 2 217 798 A2 | 8/2010 |
| JP | H 06129285 A | 5/1994 |

OTHER PUBLICATIONS

Search report for German Patent Application No. 10 2016 114 901.2, dated Mar. 15, 2017.
Office Action for Chinese Patent Application No. 2017800562797, dated Aug. 28, 2020.

* cited by examiner

DIAGNOSTIC METHOD AND DEVICE FOR CHECKING THE FUNCTIONALITY OF A COMPONENT FOR EXHAUST-GAS AFTERTREATMENT

CROSS-REFERENCE TO RELATED APPLICATIONS

This application is a National Phase Application of PCT International Application No. PCT/EP2017/070138, International Filing Date Aug. 9, 2017, claiming priority of German Patent Application No. 10 2016 114 901.2, filed Aug. 11, 2016, which is hereby incorporated by reference.

FIELD OF THE INVENTION

The invention relates to a diagnostic method for checking the functionality of a component for the exhaust-gas aftertreatment of an internal combustion engine as well as to a device for carrying out such a diagnostic method.

BACKGROUND OF THE INVENTION

Since current and future legislation on exhaust gas emissions is becoming increasingly stringent, high requirements are being made when it comes to the raw engine emissions and the exhaust-gas aftertreatment of internal combustion engines. The introduction of the next European emission standard Euro 6 for gasoline engines stipulates a limit value for the number of particles. This can mean that a gasoline particulate filter has to be used in some models. This particulate filter can also be catalytically coated. In addition, it is also required that the function of the components for the exhaust-gas aftertreatment be continuously monitored by means of an on-board diagnostic system in order to ensure compliance with the emission limits not only when the vehicle is brand new but also during its regular operation.

In this context, particularly the performance of a three-way catalytic converter is evaluated by measuring the oxygen storage capacity as well as the oxygen release capacity. For this purpose, the internal combustion engine is systematically operated during certain phases at a superstoichiometric or substoichiometric air-fuel ratio so that the oxygen storage capacity in the three-way catalytic converter or the oxygen release capacity from the three-way catalytic converter can be determined. Moreover, the functionality of the lambda sensors for regulating the air-fuel ratio can be tested by means of the on-board diagnostic system.

When it comes to externally ignited internal combustion engines, exhaust-gas aftertreatment systems are known in which a first three-way catalytic converter that is located in the exhaust gas channel and near the engine is combined with a four-way catalytic converter located in the undercarriage of the motor vehicle, in other words, with a particulate filter having a three-way-active coating.

Moreover, exhaust-gas aftertreatment systems are known in which a device to introduce secondary air into the exhaust gas channel is provided upstream from the particulate filter in order to allow a regeneration of the particulate filter without operating the internal combustion engine with an excess of oxygen.

German patent application DE 10 2011 002 438 A1 discloses a method to determine the loading of a particulate filter in the exhaust gas channel of an internal combustion engine, whereby, in addition to the exhaust gas flow, another gas flow is introduced into the exhaust gas channel by means of a pressure-boosting device located upstream from the particulate filter in order to transport a larger volume flow through the particulate filter and thus to attain a greater pressure differential during the flow through the particulate filter, whereby the pressure upstream from the particulate filter and downstream from the particulate filter is used to evaluate the load state of the particulate filter. This is done especially when, due to low exhaust gas volumes and a low exhaust gas flow, the differential pressure measurement is inadequate to obtain reliable information about the load state of the particulate filter without an additional gas flow.

Moreover, German patent application DE 10 2013 200 623 A1 discloses a method for monitoring a particulate filter which, together with an exhaust gas purifying component that serves to reduce nitrogen oxide, is arranged in the exhaust gas channel of an internal combustion engine, whereby a gas sensor with which the nitrogen oxide concentration in the exhaust gas flow can be determined is arranged behind the exhaust gas purifying component as seen in the flow direction of the exhaust gas. In this context, it is provided that a conclusion can be drawn about the proper functioning of the particulate filter on the basis of a change in the nitrogen oxide concentration downstream from the exhaust gas purifying component as compared to the nitrogen oxide concentration upstream from the particulate filter.

SUMMARY OF THE INVENTION

The invention is thus based on the objective of putting forward a diagnostic method for checking the functionality of a catalytic coating of a particulate filter or of an exhaust gas sensor arranged downstream from this particulate filter.

The objective is achieved by means of a diagnostic method according to the invention for checking the functionality of a component for the exhaust-gas aftertreatment of an internal combustion engine in the exhaust gas channel of the internal combustion engine, said method comprising the following steps:

the internal combustion engine is operated at a stoichiometric air-fuel ratio, whereby the exhaust gas of the internal combustion engine is transported through the exhaust gas channel and a stoichiometric exhaust gas is fed to the component, a superstoichiometric exhaust gas is fed to the component, whereby the internal combustion engine is operated at a stoichiometric air-fuel ratio and additional secondary air is blown into the exhaust gas upstream from the component, a reaction of the component to a superstoichiometric exhaust gas is determined, the internal combustion engine is operated at a substoichiometric air-fuel ratio, whereby a substoichiometric exhaust gas is likewise established at the component, a reaction of the component to a substoichiometric exhaust gas is determined.

A method according to the invention can test the functionality of a component, whereby the internal combustion engine only has to depart from its stoichiometric air-fuel ratio during the last phase with a substoichiometric operation. As a result, optimal exhaust gas purification is possible, also during the diagnosis of the component, so that the pollutant emissions can be kept at a low level, also during a diagnostic procedure.

Advantageous refinements and improvements of the method cited in the independent claim are rendered possible by means of the features cited in the dependent claims.

In a preferred embodiment of the diagnostic method, it is provided that the component is a particulate filter having a catalytic, preferably a three-way catalytic, coating, whereby the oxygen storage capacity (OSC) of the particulate filter is determined when a superstoichiometric exhaust gas is fed to the particulate filter, and the oxygen release capacity (RSC) from the particulate filter is determined during the substoichiometric operation of the internal combustion engine. When it comes to internal combustion engines, there can be a need for a particulate filter to be installed in the exhaust gas channel in order to filter soot particles out of the exhaust gas of the internal combustion engine. Owing to the introduction of more stringent regulations, it might be necessary to install a particulate filter in the exhaust gas channel for gasoline engines as well. In this context, particulate filters that additionally have a three-way catalytically active coating have been specially developed for gasoline engines. Such particulate filters with a three-way catalytically active coating are also referred to as four-way catalytic converters. Thanks to the method according to the invention, the efficacy of the coating of the particulate filter can be diagnosed without generating additional $NO_x$ emissions due to a richer or leaner setting for the internal combustion engine since the internal combustion engine can continue to be operated at a stoichiometric air-fuel ratio in order to generate a lean exhaust gas, and the additional oxygen is provided by the introduction of secondary air.

According to an advantageous refinement of the diagnostic method, it is provided for the secondary air to continue to be blown into the exhaust gas channel until a superstoichiometric exhaust gas is measured at a sensor downstream from the particulate filter. In order to determine the oxygen storage capacity of the particulate filter, it is advantageous for a sensor to be provided downstream from the particulate filter so that a breakthrough of oxygen through the particulate filter can be detected. If a breakthrough of oxygen through the particulate filter is detected, it can be assumed that the maximum oxygen storage capacity of the particulate filter has been reached.

In another improvement of the method, it is provided for the internal combustion engine to be switched over to operation at a substoichiometric air-fuel ratio immediately after an oxygen breakthrough has been detected downstream from the particulate filter. Once a maximum oxygen storage capacity of the particulate filter has been reached and an oxygen breakthrough occurs in the exhaust gas channel downstream from the particulate filter, the oxygen release capacity from the catalytic converter can be determined when the internal combustion engine is being operated with a substoichiometric, rich combustion air mixture. In this manner, the particulate filter is pre-conditioned to determine the oxygen release capacity since it can be assumed that the maximum oxygen storage capacity has been reached at the beginning of the measurement to determine the oxygen release capacity from the particulate filter. As a result, the oxygen release capacity can be determined very easily and can also be very easily compared to other measurements.

In this context, it is advantageously provided for the introduction of secondary air into the exhaust gas channel to be stopped as soon as an oxygen breakthrough is ascertained at the sensor downstream from the particulate filter. Simultaneously switching off the secondary air can ensure that the superstoichiometric air-fuel ratio is also established in the exhaust gas channel, taking into consideration the oxygen storage capacity of other exhaust-gas aftertreatment components such as the three-way catalytic converter. In this context, it is particularly advantageous for another exhaust gas sensor, especially another lambda sensor, to be located directly upstream from the particulate filter, so that the exhaust gas-air ratio can be determined before the flow enters the particulate filter.

In another improvement of the diagnostic method, it is provided for an evaluation of the functionality of the catalytic coating of the particulate filter to be carried out on the basis of an integration of the oxygen mass flows during operation with a superstoichiometric exhaust gas as well with a substoichiometric exhaust gas. Due to an integration of the oxygen mass flows that are flowing through the particulate filter with a superstoichiometric exhaust gas or with a substoichiometric exhaust gas, it is possible to easily determine the oxygen storage capacity in or the oxygen release capacity from the particulate filter. In this manner, a conclusion can be drawn about the functionality of the particulate filter as a function of the exhaust gas flows and as a function of a prescribed oxygen storage capacity or oxygen release capacity from the particulate filter, both of which are stored in a control unit of the internal combustion engine.

According to a preferred embodiment of the diagnostic method, it is provided for the particulate filter to be pre-conditioned by operating the internal combustion engine at a substoichiometric, rich air-fuel ratio before the secondary air is introduced. If the internal combustion engine is operated at a substoichiometric air-fuel ratio before the secondary air is introduced, then it can be assumed that no oxygen is stored in the three-way catalytically active coating of the particulate filter. Therefore, the pre-conditioning translates into a better comparability of measurements of the oxygen storage capacity of the particulate filter since it can be assumed that no oxygen is stored in the particulate filter at the beginning of the measurement.

In an alternative embodiment of the invention, it is provided that the component is a sensor, whereby a change in the signal characteristic at the sensor as a function of the oxygen content in the exhaust gas channel is employed to draw a conclusion about the functionality of the sensor. In this context, the functionality of a sensor, especially a lambda sensor, in the exhaust gas channel can be tested if a signal change of the sensor is tested for additional oxygen that has been blown in when secondary air is introduced into the exhaust gas channel.

In this context, it is especially preferred if the sensor is a lambda sensor, whereby a signal gradient of the voltage signal at the lambda sensor is evaluated when a change is made from a substoichiometric exhaust gas to a superstoichiometric exhaust gas or vice versa in order to diagnose the lambda sensor. In this context, a particularly informative aspect is the evaluation of the voltage signal at the lambda sensor when a change is made from a substoichiometric exhaust gas to a superstoichiometric exhaust gas or when a change is made from a superstoichiometric exhaust gas to a substoichiometric exhaust gas since this is where the highest gradients occur. A conclusion can be drawn about the functionality of the sensor on the basis of the speed of the signal change, so that a defect in the lambda sensor can be detected.

In another improvement of the diagnostic method, it is provided that the superstoichiometric exhaust gas has an exhaust gas-air ratio $\lambda_A > 1.1$ and the substoichiometric exhaust gas has an exhaust gas-air ratio $\lambda_A < 0.95$. Owing to the distance from a stoichiometric exhaust gas, a gradient can be ensured that is sufficiently large for the evaluation. Moreover, this ensures that one is not dealing with regulation-based fluctuations in a properly stoichiometric exhaust gas, but rather, that the lean phase and/or the rich phase were systematically introduced. In this manner, a faulty diagnosis due to unstable, dynamic regulation behavior can be ruled out.

According to the invention, a device for the exhaust-gas aftertreatment of an internal combustion engine is also being put forward which comprises an exhaust gas channel, a three-way catalytic converter arranged in the exhaust gas channel, a particulate filter with a catalytically active coating arranged downstream from the three-way catalytic converter in the flow direction as well as a lambda sensor arranged downstream from the particulate filter, whereby downstream from the three-way catalytic converter and upstream from the particulate filter, there is an opening for the supply of secondary air into the exhaust gas channel of the internal combustion engine, and which also comprises a control unit with a machine-readable program code and optionally requisite characteristic maps for the execution of the method according to the invention, whereby the catalytic coating on the particulate filter is configured as a three-way catalytically active wash coat. A four-way catalytic converter, in other words, a particulate filter with a three-way catalytically active coating, is a component that is finding widespread use in the exhaust-gas aftertreatment of externally ignited internal combustion engines. Therefore, with such a component, it is important to ensure not only the functionality of the particulate filter but also the functionality of the catalytic coating.

In a preferred embodiment of the invention, it is provided for the secondary air supply source to comprise an electrically powered secondary air pump. An electrically commutated secondary air pump offers the advantage that the secondary air pump can be switched on and off as needed. Consequently, the additional energy demand for the secondary air can be kept low and a sufficient volume of secondary air can be introduced into the exhaust gas channel for diagnostic purposes. Moreover, the secondary air pump can be utilized to assist in the regeneration of the particulate filter.

According to an advantageous refinement of the invention, it is provided for a first lambda sensor to be arranged downstream from the opening and upstream from the particulate filter, and for a second lambda sensor to be arranged in the exhaust gas channel downstream from the particulate filter. Since one lambda sensor is arranged upstream from the particulate filter and another lambda sensor is arranged downstream from the particulate filter, the oxygen content of the exhaust gas can be determined upstream and downstream from the particulate filter. This makes it particularly easy to determine the oxygen storage capacity of the particulate filter.

In another improvement of the invention, it is provided for the particulate filter to be positioned far away from the engine, preferably in the undercarriage of a motor vehicle. In this context, the term "far away from the engine" refers to a position having an exhaust gas travel path of at least 80 cm, preferably at least 100 cm, beyond the exhaust of the internal combustion engine. In order to allow a particularly efficient exhaust-gas aftertreatment, the particulate filter with the three-way catalytically active coating as the additional catalytic converter, especially in the case of high exhaust gas velocities and large exhaust gas volumes, can convert the pollutants present in the exhaust gas such as unburned hydrocarbons (HC), carbon monoxide (CO) or nitrogen oxides ($NO_x$) into non-toxic exhaust gas components. In this context, especially a combination of a small-volume three-way catalytic converter located close to the engine as well as a large-volume four-way catalytic converter located in the undercarriage can be very practical since the small three-way catalytic converter heats up very quickly during the starting phase and can permit high rates of conversion already a short time after a cold start, whereas the four-way catalytic converter can be configured with a correspondingly large volume, and can thus provide correspondingly high capacities not only as a particulate filter but also as a catalytic converter. Moreover, a four-way catalytic converter in the undercarriage normally ages more slowly than a catalytic converter located near the engine, so that an efficient exhaust gas purification can also be ensured over the service life of the motor vehicle. Furthermore, following a cold start, the secondary air pump can be employed to more quickly bring the particulate filter with the catalytic coating up to an operating temperature at which pollutants can be efficiently converted on the catalytic coating.

Additional preferred embodiments of the invention ensue from the other features cited in the subordinate claims.

Unless indicated otherwise in individual cases, the various embodiments of the invention cited in this application can be advantageously combined with each other.

BRIEF DESCRIPTION OF THE DRAWINGS

The invention will be explained in greater detail below in embodiments making reference to the accompanying drawings. The following is shown.

DETAILED DESCRIPTION OF THE INVENTION

Figure 1:
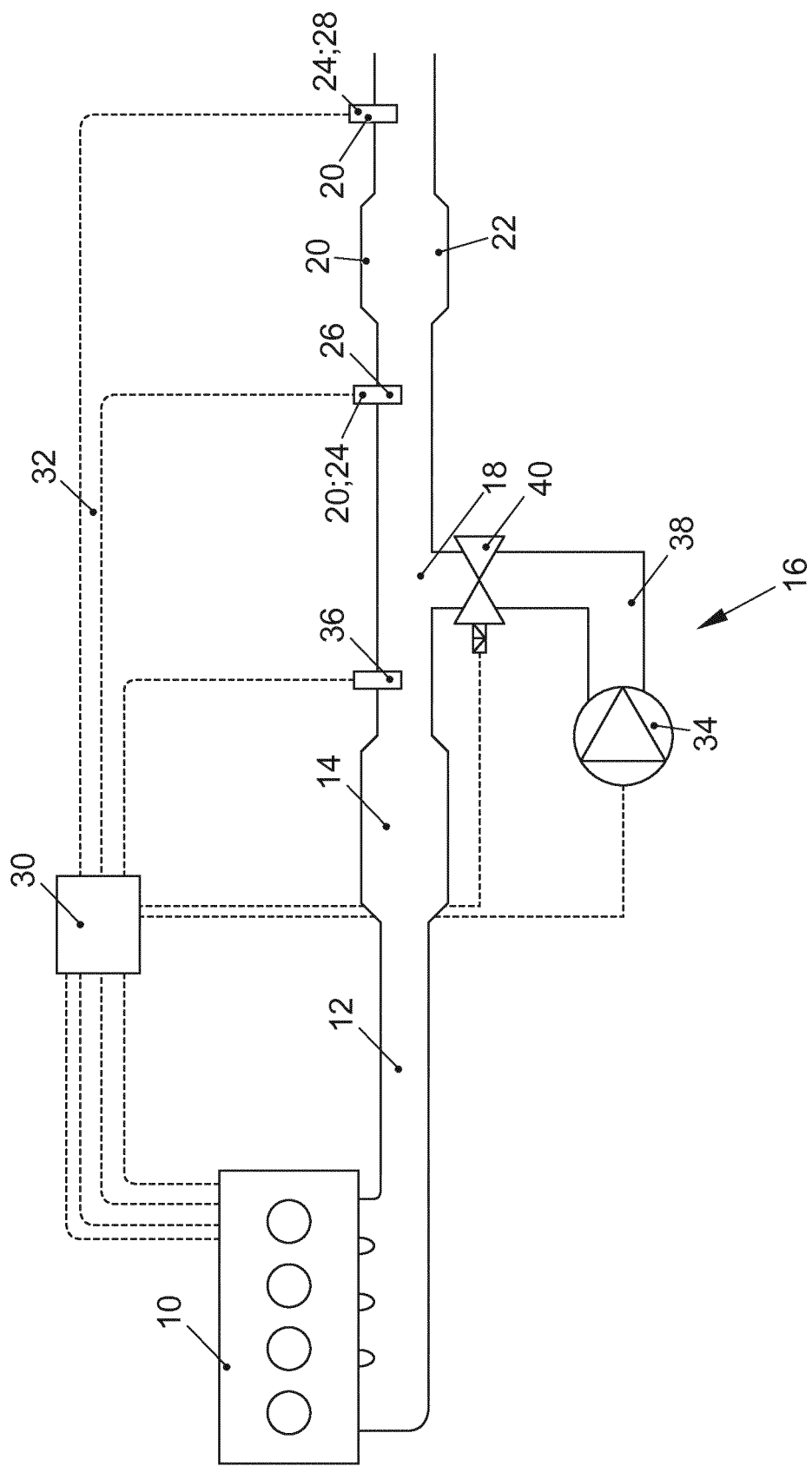
FIG. 1: an internal combustion engine with a device according to the invention for the exhaust-gas aftertreatment.

FIG. 1 shows an internal combustion engine 10 for a motor vehicle, comprising an exhaust gas channel 12 as well as a three-way catalytic converter 14 arranged in the exhaust gas channel 12. The internal combustion engine 10 is preferably configured as an externally ignited internal combustion engine 10 operating according to the Otto principle. Downstream from the three-way catalytic converter 14 as seen the flow direction of the exhaust gas, there is an opening 18 where secondary air can be introduced into the exhaust gas channel 12 of the internal combustion engine 10 by means of a secondary air supply source 16. Downstream from the opening 18, there are additional components 20 for the exhaust-gas aftertreatment, especially a particulate filter 22 with a three-way catalytically active coating, as well as lambda sensors 26, 28 that regulate the oxygen content in the exhaust gas channel 12 of the internal combustion engine 10. The lambda sensors 26, 28 are connected via signal lines 32 to a control unit 30 of the internal combustion engine 10.

Figure 2:
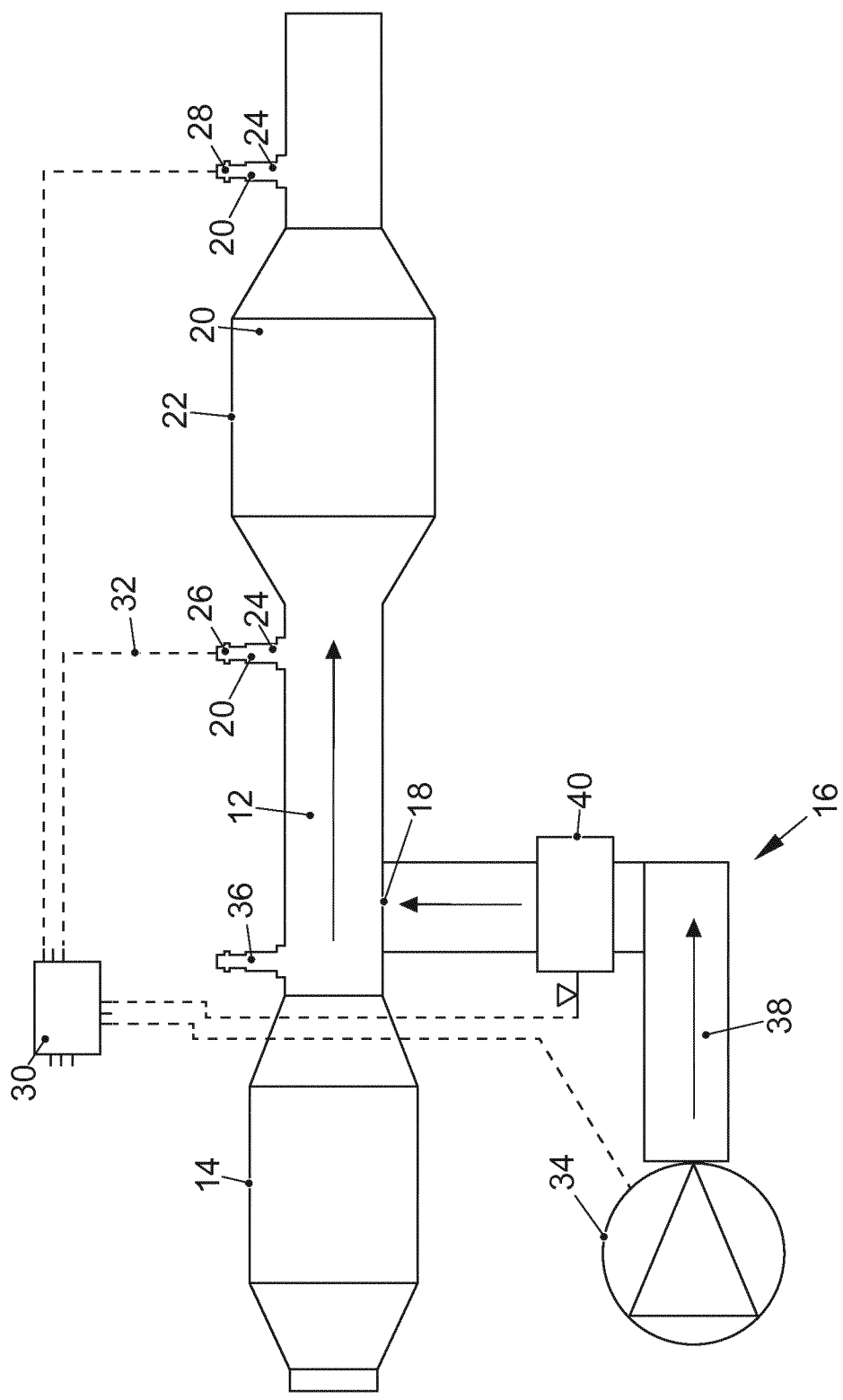
FIG. 2: an exhaust gas channel of an internal combustion engine according to the invention.

FIG. 2 again shows the exhaust gas channel 12 of the internal combustion engine 10. In the exhaust gas channel 12 downstream from the first three-way catalytic converter 14, there is another lambda sensor 36 with which the air-fuel ratio of the internal combustion engine 10 is regulated. The secondary air supply source 16 comprises a secondary air line 38 in which an electrically commutated secondary air pump 34 is installed. Between the secondary air pump 34 and the opening 18 of the secondary air line 38 in the exhaust gas channel 12, there is a shut-off valve 40 that can prevent a return flow of exhaust gas from the exhaust gas channel 12 in the direction of the secondary air pump 34. For purposes of regulation of the oxygen content in the exhaust gas channel 12, a first lambda sensor 26 is arranged upstream from the particulate filter 22 and a second lambda sensor 28 is arranged downstream from the particulate filter 22. In a simple execution variant, the first lambda sensor 26 upstream from the particulate filter 22 can be dispensed with.

Figure 3:
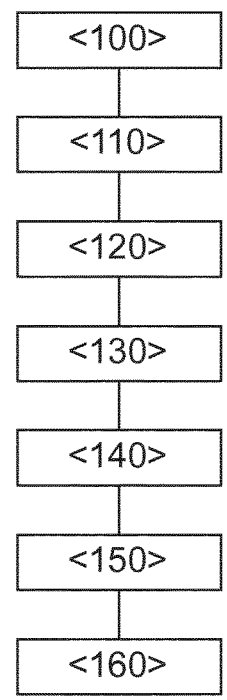
FIG. 3: a method diagram depicting the sequence of a diagnostic method according to the invention, and FIG. 4 a schematic diagram to depict the air-fuel ratio as well as the exhaust gas-air ratio during the individual phases of a diagnostic method according to the invention.

FIG. 3 shows a method diagram depicting the sequence of a diagnostic method according to the invention. During normal operation <100>, the internal combustion engine 10 is operated at an essentially stoichiometric air-fuel ratio $\lambda_E=1$. In this process, the exhaust gas is purified by means of the first three-way catalytic converter 14 and by the catalytically coated particulate filter 22. During normal operation <100>, the secondary air pump 34 is switched off and the shut-off valve 40 is closed. Now, in order to carry out the diagnostic method, in a subsequent method step <120>, air is introduced into the exhaust gas 12 of the internal combustion engine 10 by means of the secondary air pump 34. The operation with secondary air as the conditioning phase is carried out continuously until the second lambda sensor 28 downstream from the particulate filter 22 detects an excess of air. In this phase, the internal combustion engine 10 continues to be operated at a stoichiometric air-fuel ratio so that a stoichiometric exhaust gas is fed at least to the first three-way catalytic converter 14, thus allowing an efficient conversion of the HC, CO and $NO_x$ emissions. If the second lambda sensor 28 situated downstream from the particulate filter 22 detects an oxygen breakthrough, the secondary air pump 34 is switched off in a subsequent method step <130>, the shut-off valve 40 is closed and the internal combustion engine 10 is operated at a substoichiometric air-fuel ratio. In this process, initially the oxygen stored in the first three-way catalytic converter 14 and—offset in time—the oxygen stored in the particulate filter 22 are released, until a rich breakthrough is measured at the second lambda sensor 28 downstream from the particulate filter 22. In this context, in method step <140>, the first lambda sensor 26 between the opening 18 of the secondary air line 38 or the other lambda sensor 36 can determine when a rich breakthrough occurs through the first three-way catalytic converter 14 and when the oxygen stored in the particulate filter 22 starts to be released.

In a subsequent method step <150>, an evaluation of the superstoichiometric oxygen mass flows and of the substoichiometric oxygen mass flows can be used to make an assessment of the oxygen storage capacity (OSC) or of the oxygen release capacity (RSC) of the particulate filter. Moreover, in another method step <160>, the signal gradient is measured at the first lambda sensor 26 or at the second lambda sensor 28 when a change is made from a substoichiometric exhaust gas to a superstoichiometric exhaust gas, and on this basis, a conclusion can be drawn about the functionality of the lambda sensors 26, 28. In order to diagnose the particulate filter 22 and the lambda sensors 26, 28, either the introduction of secondary air when the particulate filter 22 is being heated up can be employed to oxidize the soot particles held back in it or else the secondary air pump 34 can be activated specifically for the diagnosis only. As an alternative, the introduction of secondary air following a regeneration of the particulate filter 22 can be prolonged until the diagnosis of the particulate filter 22 or of the lambda sensors 26, 28 has been ended. Once the diagnosis of the functionality of the particulate filter 22 or of the lambda sensors 26, 28 has been completed, in a subsequent method step <160>, the internal combustion engine 10 is once again run in normal operation at the stoichiometric air-fuel ratio and with the introduction of secondary air switched off.

In order to carry out a diagnosis of the particulate filter 22 and/or of the lambda sensors 26, 28 that is as trouble-free as possible, it can be advantageous if the internal combustion engine 10 is briefly operated in an intermediate method step <110> at a substoichiometric air-fuel ratio between the stoichiometric normal operation and the start of the secondary air supply in order to completely empty the oxygen storage unit in the first three-way catalytic converter 14 and in the particulate filter 22, thereby ensuring a pre-conditioning of the catalytic converters 14, 22.

Figure 4:
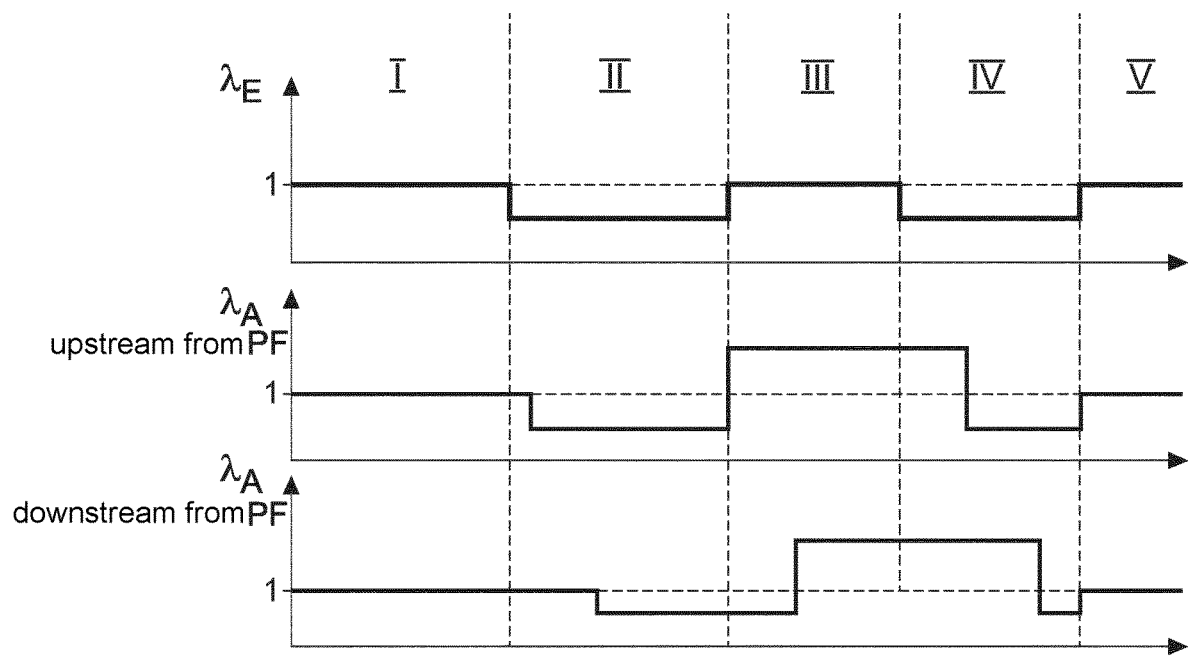

FIG. 4 shows the air-fuel ratio $\lambda_E$ of the internal combustion engine 10 as well as the exhaust gas-air ratio upstream from the particulate filter 22 (at the position of the first lambda sensor 26) as well as downstream from the particulate filter 22 (at the position of the second lambda sensor 28). During normal operation I, the internal combustion engine 10 is operated at a stoichiometric air-fuel ratio $\lambda_E=1$, while a stoichiometric exhaust gas $\lambda_A=1$ is found in the exhaust gas channel 12 upstream from the particulate filter 22 as well as downstream from the particulate filter 22. In the pre-conditioning phase II, the internal combustion engine 10 is operated at a substoichiometric air-fuel ratio $\lambda_E<1$, as a result of which, due to the oxygen storage capacity of the first three-way catalytic converter 14, a substoichiometric exhaust gas $\lambda_A<1$ is established with a time delay in the exhaust gas channel 12 upstream from the particulate filter 22 and then once again with a time delay, a substoichiometric exhaust gas $\lambda_A<1$ is also established downstream from the particulate filter 22. In phase III, if a substoichiometric exhaust gas is detected at the second lambda sensor 28, the internal combustion engine 10 is once again operated at a stoichiometric air-fuel ratio $\lambda_E=1$ and the secondary air introduction is activated. In this process, initially a superstoichiometric exhaust gas $\lambda_A>1$ is established in the exhaust gas channel 12 upstream from the particulate filter 22 and, corresponding to the oxygen storage capacity (OSC) of the particulate filter 22, a superstoichiometric exhaust gas $\lambda_A>1$ is established with a time delay downstream from the particulate filter 22. If a superstoichiometric exhaust gas $\lambda_A>1$ is measured at the second lambda sensor 28, the secondary air introduction is discontinued again and the internal combustion engine 10 is operated in phase IV at a substoichiometric air-fuel ratio $\lambda_E<1$. In this process, a substoichiometric exhaust gas $\lambda_A<1$ is established in the exhaust gas channel 12 upstream from the particulate filter 22 and, corresponding to the oxygen release capacity (RSC) of the particulate filter 22, a substoichiometric exhaust gas $\lambda_A<1$ is also established downstream from the particulate filter 22. In phase V, the diagnostic method is concluded and the internal combustion engine 10 is again operated at a stoichiometric air-fuel ratio $\lambda_E=1$, a process in which a stoichiometric exhaust gas $\lambda_A=1$ is established in the exhaust gas channel 12.

LIST OF REFERENCE NUMERALS 10 internal combustion engine
12 exhaust gas channel
14 three-way catalytic converter
16 secondary air supply source
18 opening 20 component
22 particulate filter with a catalytic coating
24 sensor
26 first lambda sensor
28 second lambda sensor
30 control unit
32 signal line
34 secondary air pump
36 additional lambda sensor
38 secondary air line
40 shut-off valve
$\lambda_E$ air-fuel ratio
$\lambda_A$ exhaust gas-air ratio

The invention claimed is:

1. A diagnostic method for checking the functionality of a particulate filter having a catalytic coating for the exhaust-gas aftertreatment of an internal combustion engine in an exhaust gas channel of the internal combustion engine, whereby the particulate filter is arranged in the exhaust-gas channel (12) downstream of a three-way catalytic converter, said method comprising the following steps:

operating the internal combustion engine at a stoichiometric air-fuel ratio $\lambda_E=1$, whereby the exhaust gas of the internal combustion engine is transported through the exhaust gas channel and a stoichiometric exhaust gas $\lambda_A=1$ is fed to the particulate filter, feeding a superstoichiometric exhaust gas $\lambda_A>1$ to the particulate filter, whereby the internal combustion engine is operated at a stoichiometric air-fuel ratio $\lambda_E=1$ and additional secondary air is blown into the exhaust gas upstream from the particulate filter, determining a reaction of the particulate filter to the superstoichiometric exhaust gas, operating the internal combustion engine at a substoichiometric air-fuel ratio $\lambda_E<1$, whereby a substoichiometric exhaust gas $\lambda_A<1$ is likewise established at the particulate filter, and determining a reaction of the particulate filter to the substoichiometric exhaust gas, whereby the oxygen storage capacity (OSC) of the particulate filter is determined when the superstoichiometric exhaust gas is fed to the particulate filter, and the oxygen release capacity (RSC) from the particulate filter is determined during the substoichiometric operation of the internal combustion engine.

2. The diagnostic method according to claim 1, wherein the secondary air continues to be blown into the exhaust gas channel until a superstoichiometric exhaust gas is measured at a sensor downstream from the particulate filter.

3. The diagnostic method according to claim 1, further comprising switching the internal combustion engine to operation at a substoichiometric air-fuel ratio immediately after an oxygen breakthrough has been detected downstream from the particulate filter.

4. The diagnostic method according to claim 2, further comprising stopping to blow secondary air into the exhaust gas channel as soon as an oxygen breakthrough is ascertained at the sensor downstream from the particulate filter.

5. The diagnostic method according to claim 1, further comprising evaluating the functionality of the catalytic coating of the particulate filter on the basis of an integration of the oxygen mass flows during operation of the internal combustion engine with a substoichiometric exhaust gas as well with a superstoichiometric exhaust gas.

6. The diagnostic method according to claim 1, further comprising, before the secondary air is introduced, preconditioning the particulate filter by operating the internal combustion engine at a substoichiometric, rich air-fuel ratio $\lambda_E<1$.

7. A device for the exhaust-gas aftertreatment of an internal combustion engine, comprising:

an exhaust gas channel, a three-way catalytic converter arranged in the exhaust gas channel, a particulate filter with a catalytically active coating arranged downstream from the three-way catalytic converter, wherein the catalytically coating on the particulate filter is configured as a three-way catalytically active wash coat, a first lambda sensor arranged downstream from the particulate filter, an opening downstream from the three-way catalytic converter and upstream from the particulate filter, for the supply of secondary air into the exhaust gas channel of the internal combustion engine, and a control unit with a machine-readable program code for the execution of the method according to claim 1.

8. The device for the exhaust-gas aftertreatment according to claim 7, wherein the secondary air supply source comprises an electrically powered secondary air pump.

9. The device for the exhaust-gas aftertreatment according to claim 7, wherein a first second lambda sensor is arranged downstream from the opening and upstream from the particulate filter.

* * * * *